United States Patent
Narayana et al.

(10) Patent No.: US 7,679,854 B1
(45) Date of Patent: Mar. 16, 2010

(54) HEAD SWITCH OPERATION FOR A DISK DRIVE

(75) Inventors: Aswartha Narayana, Foothill Ranch, CA (US); John Yin Kwong Li, Laguna Niguel, CA (US); Gary Gaoxiang Zhu, Irvine, CA (US); Jonathan V. Nguyen, Laguna Niguel, CA (US); Duc T. Phan, Saratoga, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 0 days.

(21) Appl. No.: 12/260,919

(22) Filed: Oct. 29, 2008

(51) Int. Cl.
*G11B 15/12* (2006.01)
*G11B 21/02* (2006.01)
(52) U.S. Cl. .............. 360/63; 360/61; 360/75
(58) Field of Classification Search ............ None
See application file for complete search history.

(56) References Cited

U.S. PATENT DOCUMENTS

| | | | |
|---|---|---|---|
| 5,796,546 A | 8/1998 | Sasamoto et al. | |
| 5,798,883 A | 8/1998 | Kim | |
| 5,969,895 A * | 10/1999 | Ueda et al. | 360/61 |
| 6,031,683 A | 2/2000 | Iverson et al. | |
| 6,067,206 A | 5/2000 | Hull et al. | |
| 6,388,413 B1 | 5/2002 | Ng et al. | |
| 6,538,835 B1 * | 3/2003 | Burton | 360/63 |
| 6,882,486 B1 | 4/2005 | Kupferman | |
| 6,917,485 B2 | 7/2005 | Schell et al. | |

* cited by examiner

*Primary Examiner*—Andrew L Sniezek
(74) *Attorney, Agent, or Firm*—Blakely, Sokoloff, Taylor & Zafman

(57) ABSTRACT

A disk drive for implementing a head switch operation is disclosed. The disk drive comprises: an actuator; a first head and a second head attached to the actuator; a disk having a plurality of tracks; and a processor. The processor controls operations in the disk drive including: executing a head switch command from the first head to the second head; determining that a sync-up operation is not successful for the second head at a first track; applying a torque to the actuator to move the second head to a second track; and determining that the sync-up operation is successful.

23 Claims, 5 Drawing Sheets

HEAD SWITCH OPERATION FOR A DISK DRIVE

BACKGROUND

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes one or more disks wherein each disk includes a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between data sectors around each track of each disk.

Each servo sector typically includes at least a phase locked loop (PLL) field, a servo sync mark (SSM) field, a track identification (TKID) field, a sector ID field having a sector ID number to identify the sector, and a group of servo bursts (e.g. an alternating pattern of magnetic transitions) that the servo control system of the disk drive samples to align the moveable transducer head with or relative to a particular track. Typically, the servo control system moves the transducer head toward a desired track during a "seek" mode using the TKID field as a control input. Once the moveable transducer head is generally over the desired track, the servo control system uses the servo bursts to keep the moveable transducer head over that track in a "track follow" mode.

When a head switch operation is commanded, a new head of the disk drive attempts to detect a servo sector on the disk as part of a servo sector sync-up operation. Unfortunately, the head switch operation may fail if upon the head switch, the new head is positioned on a defective track or a band of defective tracks, in which case, the servo sector sync-up operation cannot be completed and a servo failure occurs. When the servo failure occurs, the new head is parked and a new servo synchronization process needs to be performed. This degrades the performance of the disk drive.

DETAILED DESCRIPTION

Figure 1:
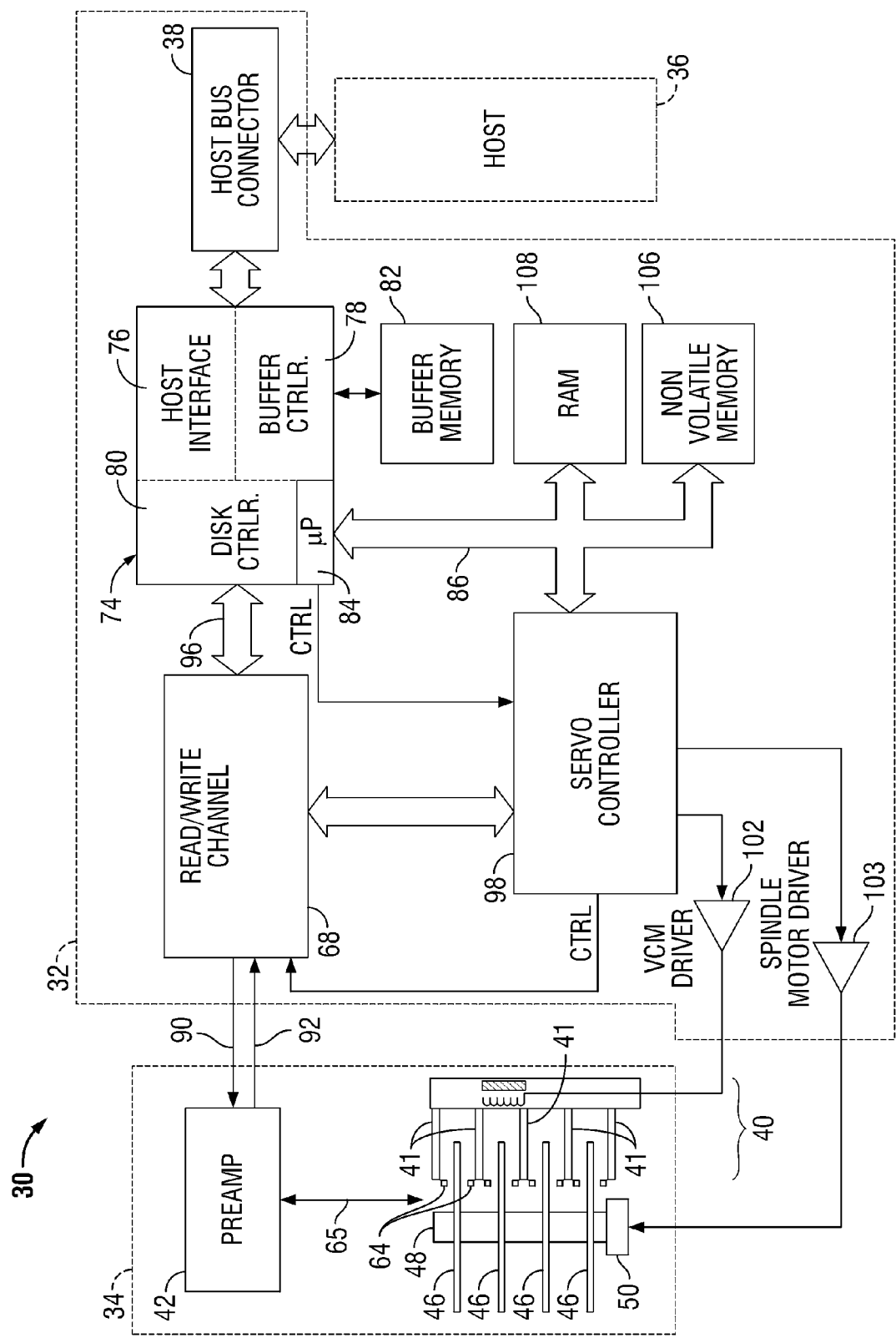
FIG. 1 shows a simplified block diagram of a disk drive, in which embodiments of the invention may be practiced.

FIG. 1 shows a simplified block diagram of a disk drive 30, in which embodiments of the invention may be practiced. Disk drive 30 comprises a Head/Disk Assembly (HDA) 34 and a controller printed circuit board assembly (PCBA) 32. Host 36 may be a computing device such as a desktop computer, a laptop computer, a server computer, a mobile computing device (e.g. PDA, camera, cell-phone, etc.), or any type of computing device. Alternatively, host 36 may be a test computer that performs calibration and testing functions as part of the disk drive manufacturing process. Disk drive 30 may be of a suitable form factor and capacity for computers or for smaller mobile devices (e.g. a small form factor (SFF) disk drive).

HDA 34 comprises: one or more disks 46 for data storage; a spindle motor 50 for rapidly spinning each disk 46 (four shown) on a spindle 48; and an actuator assembly 40 for moving a plurality of heads 64 over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 may include a read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

Host initiated operations for reading and writing data in disk drive 30 may be executed under control of microprocessor 84 connected to the controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as may be needed for execution.

During disk read and write operations, data transferred by preamplifier 42 may be encoded and decoded by read/write channel 68. During read operations, read/write channel 68 may decode data into digital bits transferred on an NRZ bus 96 to HIDC 74. During write operations, HIDC may provide digital data over the NRZ bus to read/write channel 68 which encodes the data prior to its transmittal to preamplifier 42. As one example, read/write channel 68 may employ PRML (partial response maximum likelihood) coding techniques, although other coding processes may also be utilized.

HIDC 74 may comprise a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103. For example, disk drive 30 may employ a sampled servo system in which equally spaced servo sectors are recorded on each track of each disk 46. Data sectors are recorded in the intervals between servo sectors on each track. Servo sectors are sampled at regular intervals by servo controller 98 to provide servo position information to microprocessor 84. Servo sectors are received by read/write channel 68, and are processed by servo controller 98 to provide position information to microprocessor 84 via bus 86.

Figure 2:
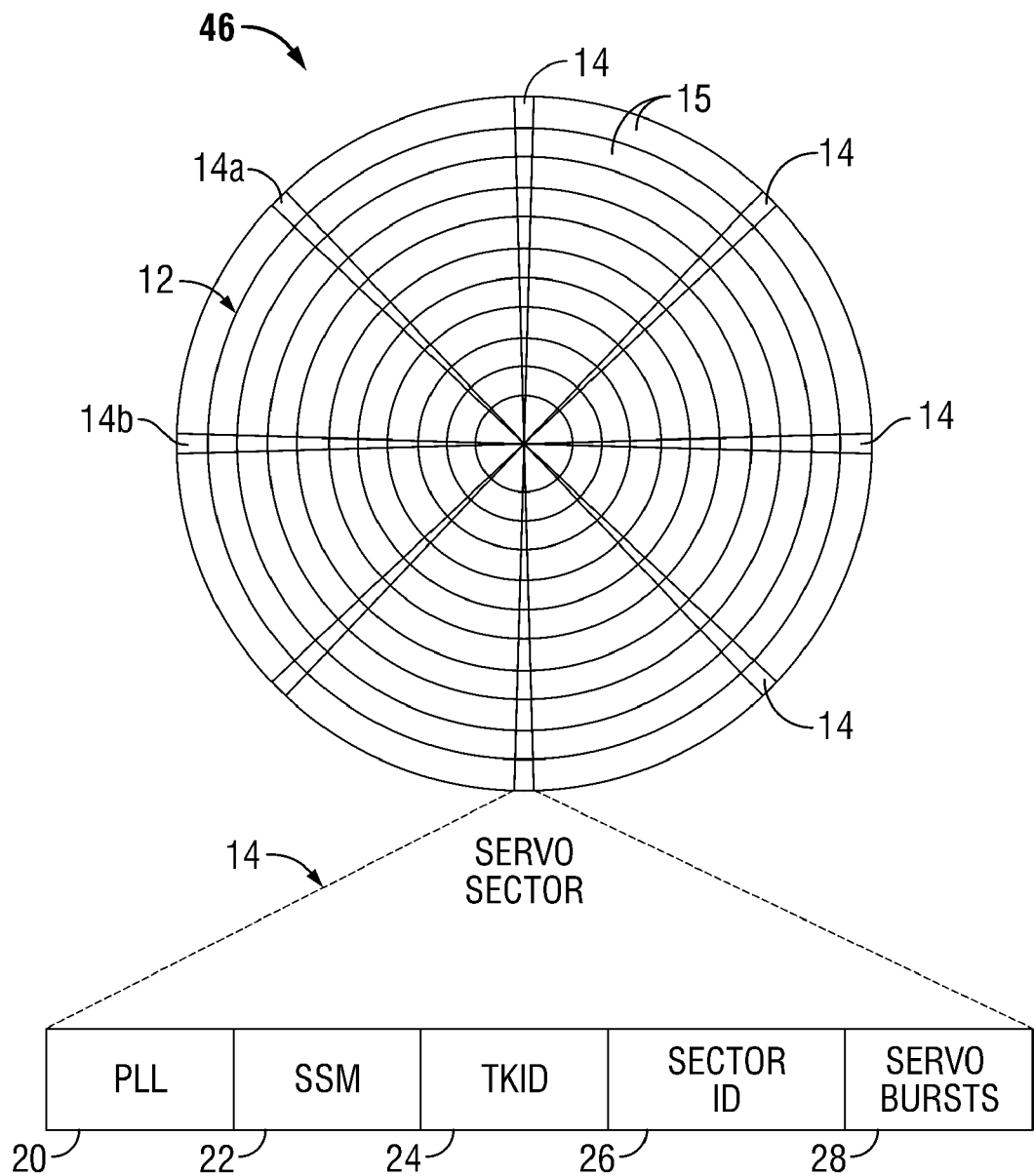
FIG. 2 shows a disk of disk drive having servo sectors, according to one embodiment of the invention.

FIG. 2 shows a disk 46 of disk drive 30 of FIG. 1 having a plurality of concentric tracks, and more particularly, illustrates a disk 46 that includes servo sectors 14 in accordance with one embodiment of the invention. The plurality of servo sectors 14 are servo-written circumferentially around disk 46 to define circumferential tracks 12 and are utilized in seeking and track following. In particular, embedded servo sectors 14a, 14b, etc., contain servo information utilized in seeking and track following and are interspersed between data regions 15 of the disk 46. Data is conventionally written in the data regions 15 in a plurality of discrete data sectors. Each data region 15 is typically preceded by a servo sector 14.

Each servo sector 14 may include: a phase lock loop (PLL) field 20, a servo sync mark (SSM) field 22, a track identification (TKID) field 24, a sector identifier (ID) field 26; and a group of servo bursts (e.g. ABCD) 28 (e.g. an alternating pattern of magnetic transitions) that the servo control system samples to align the moveable transducer head with, and relative to, a particular track. Typically, servo controller 98 moves the transducer head 64 toward a desired track during a "seek" mode using the TKID field 24 as a control input. In order to perform seeking and track following operations by servo controller 98, a servo field sync-up operation is performed to detect a servo sector 14.

A preamble—such as the phase lock loop (PLL) field 20—is generally read first by the read/write channel 68 as part of a servo field sync-up operation to recover the timing and gain of the written servo sector 14. For example, the PLL field may be written with a 2T pattern, as is well known in the art.

Next, the servo sync mark (SSM) 22 is read to facilitate block synchronization. The SSM 22 facilitates block synchronization by acting as a special marker that is detected to "frame" data, i.e., to identify a boundary of a block. Servo field sync-up operations to detect a servo preamble, such as PLL 20, to recover the timing and gain of a written servo sector and to detect the servo sector for servo control operations are well known in the art.

Once head 64 is generally over a desired track 12, servo controller 98 uses the servo bursts (e.g. ABCD) 28 to keep head 64 over the track in a "track follow" mode. During track following mode, head 64 repeatedly reads the sector ID 26 of each successive servo sector to obtain the binary encoded sector ID number that identifies each sector of the track. Based on the TKID and sector ID, servo controller 98 continuously knows where head 64 is relative to disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

In one embodiment, microprocessor 84 may operate under the control of a program or routine to execute methods or processes in accordance with embodiments of the invention related to implementing a head switch command from a first head to a second head. If a sync-up operation is not successful for the second head at a first track of a new disk 46 or the opposite side of the same disk 46, microprocessor 84 may command the application of a torque to actuator assembly 40 to move the second head to a second track of the disk where a sync-up operation is successfully performed. For example, such a program may be implemented in software or firmware (e.g. stored in non-volatile memory 106 or other locations) and may be implemented by microprocessor 84.

For the purposes of the present specification, it should be appreciated that the terms "processor", "microprocessor", and "controller", etc., refer to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, etc. Further, it should be appreciated that the term processor, microprocessor, circuitry, controller, etc., refer to any type of logic or circuitry capable of executing logic, commands, instructions, software, firmware, functionality, etc.

As previously described, microprocessor 84 controls operations in disk drive 30 including seeking and tracking operations in which heads 64 are moved between first and second tracks on disks 46 by the movement of the actuator arms 41 of actuator assembly 40.

In one embodiment of the invention, microprocessor 84 controls operations in disk drive 30 including executing a head switch command from a first head to a second head 64 and determining whether a sync-up operation is successful or not successful for the second head at a first track of a new disk 46 or the opposite side of the same disk. If the sync-up operation is not successful, microprocessor 84 may command that a torque be applied to actuator assembly 40 to move the second head 64 to a second track. Next, microprocessor 84 may then determine whether the sync-up operation is successful. The torque applied to actuator assembly 40 may, in one embodiment, be a pre-determined torque.

In one embodiment, determining that a sync-up operation is not successful is accomplished by determining that the track identifier (TKID) value 24 of the first track is not consistent with an expected track identifier evaluation criteria. In particular, determining whether the TKID value 24 of the first track is not consistent with the expected track identifier evaluation criteria is accomplished by determining whether the TKID value exceeds a range of TKID values.

Thus, embodiments of the invention relate to methods and processes for a disk drive to determine after a head switch command, whether the new head has landed on a defective track or a band of defective tracks, and, if so, provides a technique to move the head to a neighboring non-defective track to synchronize servo sectors. Additionally, these techniques may be used if the head switch command places the new head on a track where the new head falsely synchronizes to patterns in a data stream.

Figure 3:
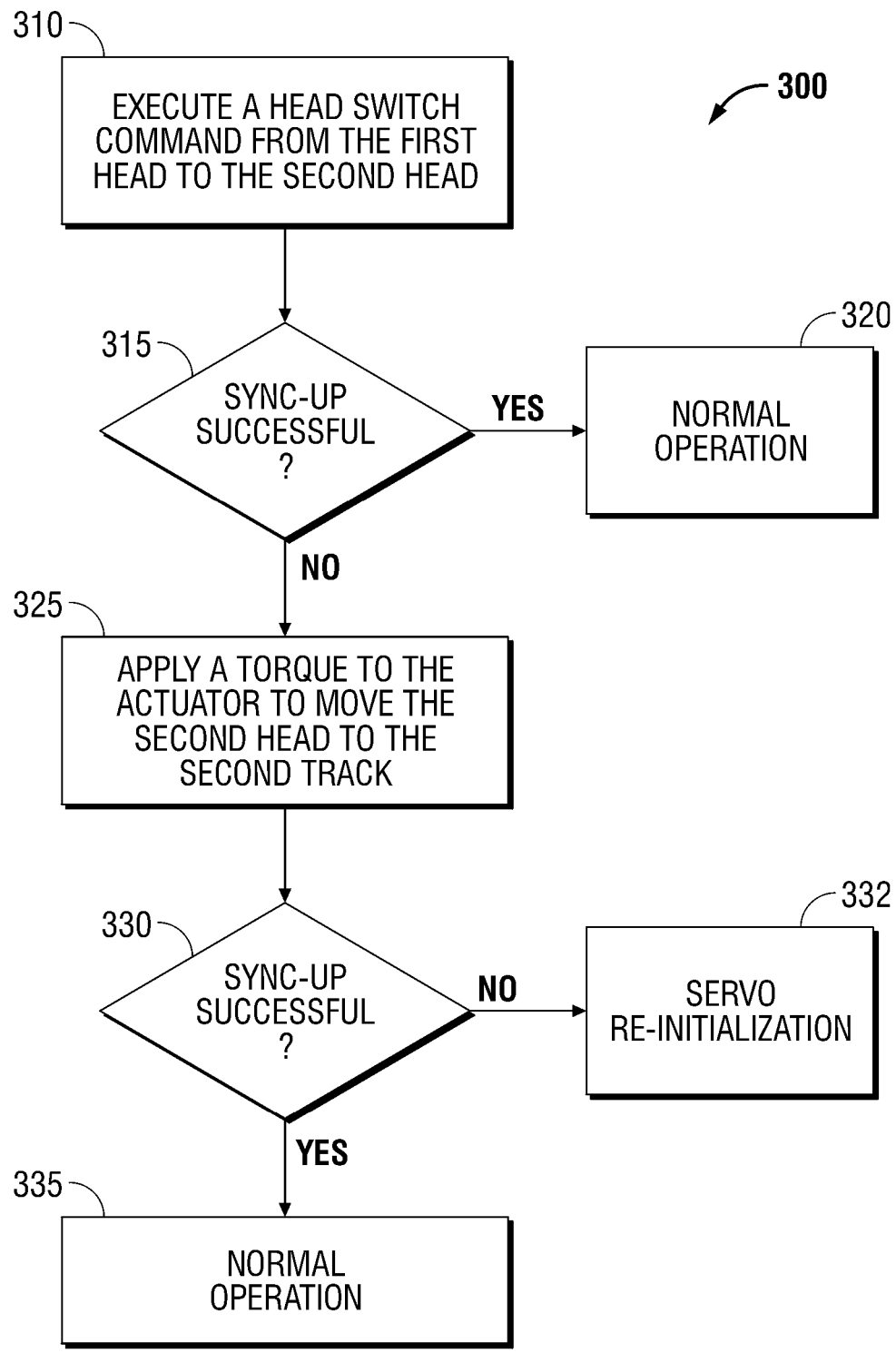
FIG. 3 is a flow diagram of a process to execute a head switch command, according to one embodiment of the invention.

FIG. 3 is a flow diagram of a process 300 to execute a head switch command, according to one embodiment of the invention. In one embodiment, process 300 may be implemented by microprocessor 84 under the control of a program.

In process 300, a head switch command is executed to perform a head switch from the first head to the second head (block 310). It is next determined whether a sync-up operation is successful for the second head at a first track of a new disk or on the opposite side of the same disk (decision block 315). If the sync-up operation is successful, tracking operations may continue at the new first track. If not, a torque is applied by the actuator to move the second head to a second track (block 325).

Next, process 300 determines whether the sync-up operation is successful (decision block 330). This may be accomplished by determining that the read TKID value of the second track meets a predetermined set of criteria. For example, the TKID may be checked to determine if it falls within the possible range of TKIDs for the disk drive. The TKID for a first servo wedge may also be checked against the TKID of a second servo wedge to determine if the difference falls within an acceptable range of tracks (e.g., +/−10 tracks). The TKID from a third servo wedge may also be checked against the first and second TKIDs to determine if the third TKID falls within similar criteria. Alternative criteria may also be used as necessary. In one embodiment, the sync-up operation may be deemed successful if two consecutive TKIDs satisfy the criteria. Other embodiments may evaluate more TKIDs to determine successful sync-up. In one embodiment, a maximum of 128 consecutive TKIDs may be examined to determine whether there was a successful sync-up.

If the sync-up operation is not successful, servo re-initialization may be performed in which the second head is moved to a pre-determined track that is known to be valid (block 332). For example, such a pre-determined track may be near the MD. Alternatively, in another embodiment, if the sync-up operation is not successful, a torque may be applied again to the actuator to further move the second head toward another track. If the sync-up operation is successful, however, the second head may proceed with normal operations such as track following, reading, writing, etc. (block 335).

Figure 4:
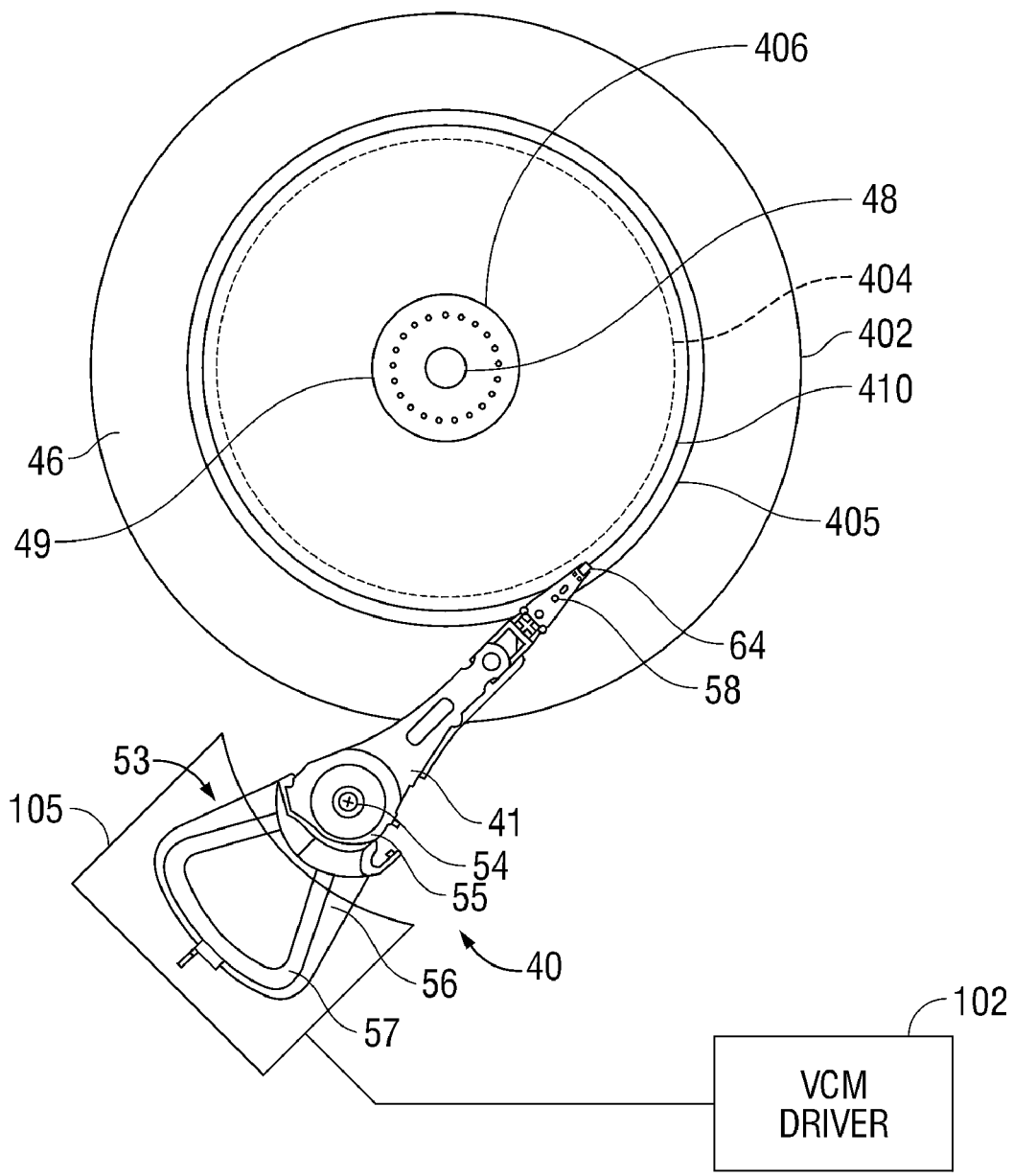
FIG. 4 is a diagram showing an example of a rotary actuator assembly and a VCM driver to illustrate embodiments of the invention.

FIG. 4 is a diagram showing an example of rotary actuator assembly 40 and a VCM driver 102, to illustrate embodiments of the invention. As shown in FIG. 4, rotary actuator 40 is shown relative to a disk 46 for pivoting a head 64 of an actuator arm 41 about the disk to perform seeking, tracking, read/write operations, etc.

As previously described, a plurality of disks 46 may be mounted within a disk drive on a spindle 48 utilizing a disk clamp 49 for rapid rotation within the disk drive. Rotary actuator 40 in turn moves head 64 over disk 46. It should be appreciated as described with reference to FIG. 1, that rotary actuator 40 may include a plurality of actuator arms 41 having a plurality of heads 64 to move about a plurality of disks 46. However, with reference to FIG. 4, only one actuator arm 41 and one disk 46 are shown to illustrate embodiments of the invention.

Rotary actuator 40 may be part of a head stack assembly (HSA) of HDA 34, as previously described. It should be appreciated that HSAs and rotary actuators are well known in the art, and this is but one example.

Looking at this particular example, rotary actuator 40 may include a head gimbal assembly (HGA) 58 to which a head 64 is mounted, a body portion 55 having a pivot bore for receipt of pivot bearing cartridge 54, at least one actuator arm 41 cantilevered from the body portion 55, and a coil assembly 53 cantilevered from the body portion 55 at an opposite direction from the actuator arm 41. Actuator arm 41 supports HGA 58 that supports head 64 for writing and reading data to and from disk 46, respectively. For example, head 64 may include an inductive head that is used both to read and write data on a recording surface of disk 46, or a magnetoresistance (MR) head, which includes a MR head element to read data and an inductive element to write data. Further, disk 46 may be a lateral or parallel type of media or may be a perpendicular media recording (PMR) disk.

Coil assembly 53 includes a coil 57 and fork 56. Fork 56 may be cantilevered from body portion 55 in an opposite direction from actuator arm 41 and mounts coil 57. The rotary actuator 40 is pivotally secured to the base of the disk drive via the pivot bearing cartridge 54 mounted through the pivot bore of the body portion 55 of rotary actuator 40. In this way, head 64 at the distal arm of HGA 58 may be moved over recording surface of disk 46. It should be appreciated that rotary actuator 40 may include a vertical stack of HGAs supported by multiple actuator arms 41 for use with multiple vertically stacked disks 46.

As previously described with reference to FIG. 1, a voice coil motor driver 102 may be utilized with actuator 40 in order to precisely position actuator 40 under the control of servo controller 98 and microprocessor 84. In one example, the voice coil motor (VCM) may include one or more VCM plates 105 which each include a permanent magnet. Coil 57 of actuator 40 may be disposed between top and bottom VCM plates in order to form a voice coil motor (VCM) to cause the pivoting of the actuator 40 about the pivot access defined by the pivot bearing cartridge 54 by inputting current into coil 57 by VCM driver 102. Thus, the voice coil motor can be used to controllably position head 64 of actuator 40 for seeking, tracking, and reading/writing data. However, it should be appreciated that many other types of actuators and positioning means for the actuator may be utilized in accordance with embodiments of the invention, and this is just one example. For example, in other embodiments, the actuator may be a dual-stage actuator that includes a second actuator near the head 64 for precisely positioning the head 64.

Looking particularly at disk 46, disk 46 includes an outer diameter (OD) 402, a middle diameter (MD) 404, and an inner diameter (ID) 406. In this embodiment, microprocessor 84 may execute a head switch command from a first head (not shown) to a second head 64 (as shown in FIG. 4). Next, a sync-up operation is performed for the second head at a first track 405. If this sync-up operation is not successful for the second head 64 at the first track 405, a torque is applied to actuator 40 by VCM driver 102 to move the second head 64 to a second track 410. It is then determined whether the sync-up operation is successful at the second track 410. The torque that is applied is typically a pre-determined torque implemented by microprocessor 84 through VCM driver 102.

The sync-up operation may include determining whether a track identifier (TKID) value of the first track is consistent with an expected track identifier valuation criteria. In one embodiment, this includes determining whether read TKID values from the first track 405 exceed a range of track identifier values. For example, a range of track identifier values may be +/−10. Thus, if the first track 405 is supposed to have a TKID value of 1000 but instead various TKID values of 1050, 1060, 1080 are read, it is determined that the TKID values exceed the range of track identifier values. In this case, a torque is applied by VCM driver 102 to actuator 40 to move the second head 64 towards the middle diameter 404 to the second track 410. Alternatively, if the first track was initially closer to the ID 406, the torque may be applied to move actuator 40 in the opposite direction towards the MD 404 of disk 46.

On the other hand, if the read TKID values from the first track 405 did not exceed the range of TKID values (e.g. TKID values of 1002, 1003, 999) then the sync-up operation would be determined to be successful and track following, read/write operations, etc. may proceed along first track 405. Other criteria may be used to determine if the sync-up operation is successful, such as determining that a certain number of SSMs were detected over a given number of servo sectors.

Thus, VCM driver 102 is coupled to actuator 40 and is utilized to move actuator 40. In particular, microprocessor 84 may command that a pre-determined amount of voltage be applied by VCM driver 102 to actuator 40 in order to apply a pre-determined amount of torque to actuator 40 to move second head 64 to second track 410 to accomplish a successful sync-up operation at second track 410.

In one particular embodiment, the pre-determined amount of voltage to be applied to actuator 40 to apply the pre-determined amount of torque to actuator 40 may be determined by a digital to analog converter (DAC) count. The DAC count may be calculated by microprocessor 84 based upon mechanical parameters of the disk drive. For example, in one embodiment, a DAC count is determined such that 20 DAC counts will move the head by one track. Thus, microprocessor 84 may command that a DAC control input be applied to VCM driver 102 such that VCM driver 102 applies a pre-determined amount of voltage to actuator 40 in order to apply a pre-determined amount of torque to actuator 40 to move second head 64 to second track 410 to accomplish a successful sync-up operation at second track 410.

As previously described with reference to FIG. 1, it should be noted that a first head may be associated with a first side of a disk 46 and a second head may be associated with a second side of the same disk 46. Additionally, with a plurality of disks 46, a first head may be associated with a first disk and a second head may be associated with a second disk.

Additionally, as previously described, an actuator 40 may comprise a first actuator arm 41 coupled to a first and second head and a second actuator arm 41 coupled to the second head and the first actuator arm such that the microprocessor 84 may command a pre-determined amount of voltage to be applied to the first and second actuator arms when moving the second head to the second track. In the case of a dual-stage actuator, the microprocessor 84 may command a pre-determined amount of voltage to be applied to the secondary actuator and/or the secondary actuator.

Thus, this technique may result in a successful sync-up operation for a new head at a new track and avoids a complete servo failure. This is particularly useful for PMR disks that tend to have bad track zones, such as, in the seam area. In particular, embodiments of the invention solve the problem related to servo failures that occur after a head switch results in a new head landing on a bad track or in a zone of bad tracks. Additionally, embodiments of the invention solve the problem related to servo failures that occur after a head switch results in a new head falsely synchronizing to patterns in a data stream. The previously described inventive techniques bypass the bad track or the band of bad tracks by moving the actuator with a pre-defined torque to find valid tracks where normal operations can be continued. Thus, the previously described techniques are robust and help increase the number of successful head switch operations.

Figure 5:
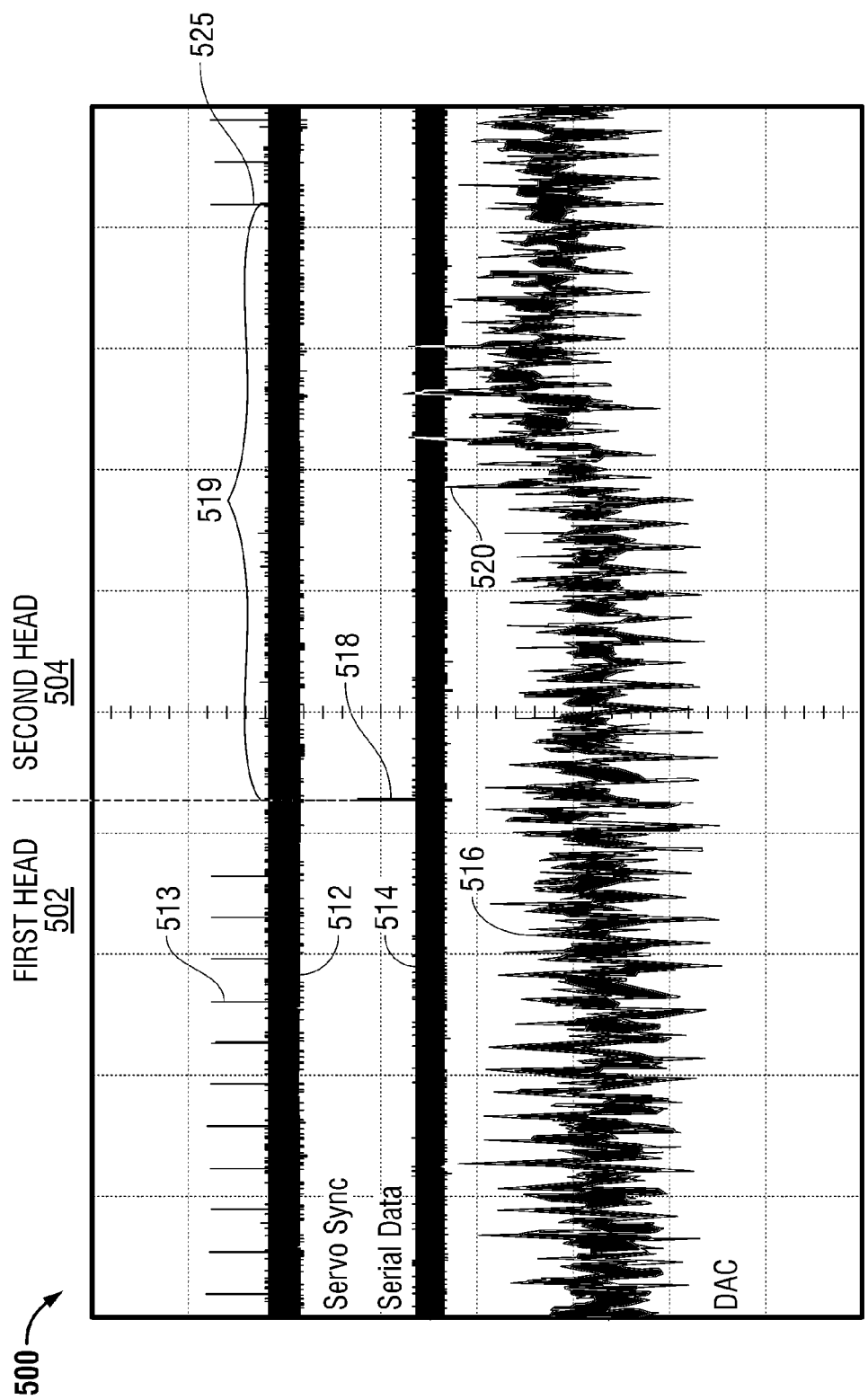
FIG. 5 is a signal representation graph illustrating a successful head switch operation caused by the movement of the actuator to move a second head to a second track to achieve a successful sync-up operation, according to one embodiment of the invention.

FIG. 5 is a signal representation graph 500 illustrating an example successful head switch operation caused by the movement of the actuator to move a second head to a second track to achieve a successful sync-up operation, according to one embodiment of the invention.

As shown in FIG. 5, a first head 502 has successful servo sync-up data 512 for a track by successfully identifying PLL, SSM, and TKID values for servo sectors as indicated by lines 513. Next, a head switch command is executed via serial data 514 as indicated at line 518. At this point, second head 504 is required to achieve a successful servo sync-up operation on another track on the opposite side of the same disk or on a different disk. However, as seen among the servo sync-up operation data 512, as identified along indicator 519, the servo sync-up operation is not successful and an accurate TKID value cannot be identified.

Based upon this, digital to analog converter (DAC) count values are increased by the microprocessor to apply a pre-determined amount of voltage to the VCM driver to move the actuator such that the second head 504 is moved a pre-determined amount towards the MD of the disk in order to find a valid track having TKID values that satisfy the expected TKID valuation criteria. In this way, a successful sync-up operation is achieved.

As can be seen along DAC signal representation 516, at approximately point 520, the DAC values begin to be increased such that the actuator and head are moved to valid tracks such that, as indicated by line 525 of the servo sync-up data 512, the servo sync-up operation is successful and valid TKID values have been found. Thus, at point 525, the second head 525 has been moved from bad tracks to a valid track.

While embodiments of the invention and its various functional components have been described in particular embodiments, it should be appreciated that the embodiments can be implemented in hardware, software, firmware, or combinations thereof.

The methods and processes previously described can be employed for disk drives with embedded servo systems. However, numerous alternatives for disk drives or other types of storage devices with similar or other media format characteristics can be employed by those skilled in the art to use the invention with equal advantage to implement these techniques. Further, although embodiments have been described in the context of a disk drive with embedded servo sectors, the invention can be employed in many different types of disk drives or other storage devices having a head that scans the media.

What is claimed is:

1. A disk drive comprising:
an actuator;
a first head and a second head attached to the actuator;
a disk having a plurality of tracks; and
a processor for controlling operations in the disk drive by:
executing a head switch command from the first head to the second head;
determining that a sync-up operation is not successful for the second head at a first track;
applying a torque to the actuator to move the second head to a second track; and
determining that the sync-up operation is successful.

2. The disk drive of claim 1, wherein the torque applied to the actuator is a pre-determined torque.

3. The disk drive of claim 1, wherein a substantial majority of the plurality of tracks include servo sectors, each servo sector including at least a servo sync mark and a track identifier, wherein determining that a sync-up operation is not successful further comprises determining that a track identifier of the first track is not consistent with an expected track identifier valuation criteria.

4. The disk drive of claim 3, wherein the expected track identifier valuation criteria is a range of track identifier values and determining that the track identifier of the first track is not consistent with the expected track identifier valuation criteria further comprises determining that the track identifier exceeds the range of track identifier values.

5. The disk drive of claim 1, wherein the disk includes an outer diameter, an inner diameter, and a middle diameter, and if the first track is closer to the outer diameter, the torque is applied to the actuator to move the second head towards the middle diameter of the disk.

6. The disk drive of claim 1, wherein the disk includes an outer diameter, an inner diameter, and a middle diameter, and if the first track is closer to the inner diameter, the torque is applied to the actuator to move the second head towards the middle diameter of the disk.

7. The disk drive of claim 1, further comprising a voice coil motor (VCM) driver coupled to the actuator to move the actuator, wherein the processor commands a pre-determined amount of voltage to be applied to the VCM driver to apply the torque to the actuator to move the second head to the second track.

8. The disk drive of claim 7, wherein the pre-determined amount of voltage applied is determined by a digital to analog converter (DAC) count.

9. The disk drive of claim 1, wherein the first head is associated with a first side of the disk and the second head is associated with a second side of the disk.

10. The disk drive of claim 1, further comprising a plurality of disks including at least a first disk and a second disk, wherein the first head is associated with the first disk and the second head is associated with the second disk.

11. The disk drive of claim 1, wherein the disk is a perpendicular magnetic recording (PMR) disk.

12. The disk drive of claim 1, wherein the actuator comprises a first actuator coupled to the first and second head, and a second actuator coupled to the second head and the first actuator, wherein the processor commands a pre-determined amount of voltage to be applied to the first and second actuator to move the second head to the second track.

13. A method for switching head operations in a disk drive, the disk drive including a disk having a plurality of tracks and a first head and a second head attached to an actuator, the method comprising:
  executing a head switch command from the first head to the second head;
  determining that a sync-up operation is not successful for the second head at a first track;
  applying a torque to the actuator to move the second head to a second track; and
  determining that the sync-up operation is successful.

14. The method of claim 13, wherein the torque applied to the actuator is a pre-determined torque.

15. The method of claim 13, wherein a substantial majority of the plurality of tracks include servo sectors and each servo sector includes at least a servo sync mark and a track identifier, and wherein determining that a sync-up operation is not successful further comprises:
  determining that a track identifier of the first track is not consistent with an expected track identifier valuation criteria.

16. The method of claim 15, wherein the expected track identifier valuation criteria is a range of track identifier values and determining that the track identifier of the first track is not consistent with the expected track identifier valuation criteria further comprises:
  determining that the track identifier exceeds the range of track identifier values.

17. The method of claim 13, wherein the disk includes an outer diameter, an inner diameter, and a middle diameter, and if the first track is closer to the outer diameter, the method further comprises:
  applying the torque to the actuator to move the second head towards the middle diameter of the disk.

18. The method of claim 13, wherein the disk includes an outer diameter, an inner diameter, and a middle diameter, and if the first track is closer to the inner diameter, the method further comprises:
  applying the torque to the actuator to move the second head towards the middle diameter of the disk.

19. The method of claim 13, further comprising commanding a pre-determined amount of voltage to apply the torque to the actuator to move the second head to the second track.

20. The method of claim 19, wherein the pre-determined amount of voltage applied is determined by a digital to analog converter (DAC) count.

21. The method of claim 13, wherein the first head is associated with a first side of the disk and the second head is associated with a second side of the disk.

22. The method of claim 13, wherein the disk drive further comprises a plurality of disks including at least a first disk and a second disk, wherein the first head is associated with the first disk and the second head is associated with the second disk.

23. The method of claim 13, wherein the disk is a perpendicular magnetic recording (PMR) disk.

* * * * *